United States Patent Office 3,574,200
Patented Apr. 6, 1971

3,574,200
BASIC DYESTUFFS
Alfred Brack, Leverkusen, Germany, assignor to Farbenfabriken Bayer Aktiengesellschaft, Leverkusen, Germany
No Drawing. Filed Oct. 24, 1968, Ser. No. 770,408
Claims priority, application Germany, Nov. 2, 1967,
P 16 44 674.5
Int. Cl. C09b 23/00
U.S. Cl. 260—240                 12 Claims

ABSTRACT OF THE DISCLOSURE

Dyestuffs are produced having the formula

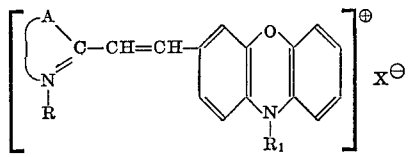

in which A denotes the residual member of a heterocyclic 5- or 6-membered ring or a heterocyclic 5- or 6-membered ring carrying further anellated rings; R stands for hydrogen, an alkyl, aralkyl, cycloalkyl or aryl radical or for a dialkylamino group, and R being a residue further linked to A or to a ring anellated to A; $R_1$ represents an alkyl, aralkyl, cycloalkyl or aryl radical; X denotes an anionic radical; which dyestuffs are particularly adapted for dyeing, printing and mass dyeing of synthetic and semi-synthetic materials or for the production of inks and pastes and are characterized in such uses as being extremely fast.

---

The object of the invention comprises new dyestuffs of the formula

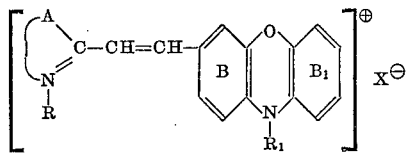

in which A denotes the residual members of a heterocyclic 5- or 6-membered ring which may carry further anellated rings; R is hydrogen or an alkyl, aralkyl, cycloalkyl or aryl radical or a dialkylamino group, and R may also be linked to A or to a ring anellated to A; $R_1$ denotes an alkyl, aralkyl, cycloalkyl or aryl radical, and $R_1$ may also be linked to the rings B or $B_1$; and X is an anionic radical. The radicals A (including any rings anellated to A), R, $R_1$ and the rings B and $B_1$ may contain non-ionic substituents, and other, optionally substituted rings may be anellated to the rings B and $B_1$.

Suitable non-ionic substitutents are, for example, halogen, especially fluoro, chloro or bromo substituents; lower alkyl groups, such as methyl, ethyl, n-propyl, isopropyl and butyl groups; nitro and cyano groups; halomethyl, such as trifluoro methyl groups; alkylsulphone, such as methylsulphone or ethyl-sulphone groups; arylsulphone, such as phenylsulphone groups; sulphonamide, substituted sulphonamide; acyl, such as acetyl groups; hydroxy groups; alkoxy, such as methoxy and ethoxy groups; aralkyl, such as benzyl groups; aralkoxy, such as benzyloxy groups; aryloxy, such as phenyloxy groups; aryl radicals, such as phenyl radicals and phenyl radicals substituted by non-ionic radicals, e.g. chlorophenyl, methylphenyl; alkoxyaryl, such as methoxy- and ethoxyphenyl radicals; carboxylic acid ester groups, such as carboxylic acid methyl or ethyl ester; carbonamide groups which may be N-substituted, the preferred N-substituents being lower alkyl groups; amino, acylamino, such as acetylamino, propionylamino groups; methyl-sulphonylamino, benzoylamino, benzene-sulphonylamino and acyloxy groups, such as acetoxy or the p-toluene-sulphonyloxy group.

The new dyestuffs are obtained by reacting compounds of the formula

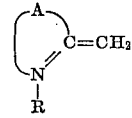

with phenoxazine aldehydes of the formula

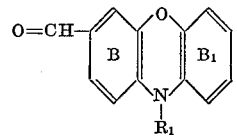

or with their functional derivatives, in the presence of an acidic condensation agent or of another condensation agent yielding an anion X⁻. It is also possible to replace the compounds (II) with their salts of the formula

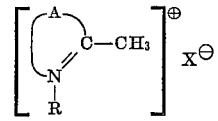

The new dyestuffs can also be obtained by using, instead of a compound (II), the corresponding compound

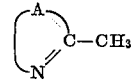

or its salt

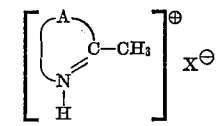

and, in the case where R is not intended to be H, to prepare from the resultant dyestuff salt

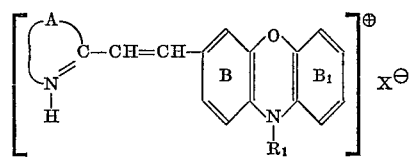

in the usual manner the dyestuff base

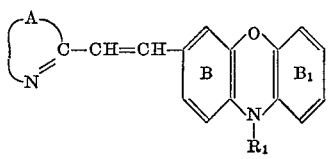

which is then converted according to the invention into dyestuffs of the Formula I by treatment with quaternising agents.

Another method of carrying out the process consists in that aldehydes of the formula

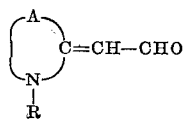

or their functional derivatives are condensed with phenoxazines of the formula

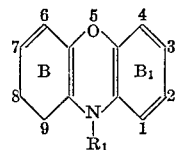

(VIII)

In the Formulae IIa, IV, IVa, V, VI, VII and VIII, the symbols A, R and $R_1$, as well as the rings contained in the compounds (I) to (VIII) may contain non-ionic substituents, with the obvious proviso that in the compounds (VIII) at least one of the positions 3 and 7 must be unsubstituted in order to obtain dyestuffs of the Formula I.

Functional derivatives of the aldehydes (III) and (VII) are, for example, the corresponding azomethines, oximes, hydrazones, nitrones, acetals and geminal dihalo compounds. Functional aldehyde derivatives which are particularly suitable for carrying out the process of the invention are the primary products of the Vilsmeier aldehyde synthesis from amine (in this case phenoxazine or a compound of the Formula II) and e.g. phosgene (or phosphorus oxychloride) and dialkyl formamides. It is therefore generally possible and frequently of advantage to prepare the aldehydes (III) and (VII) or the corresponding Vilsmeier primary products and to condense them, without intermediate isolation, with the compounds (II) or (VIII) (single pot process).

Suitable compounds of the Formula II are, for example
1,3,3-trimethyl-2-methylene-indoline (Formula IX),
1-ethyl-3,3-dimethyl-2-methylene-indoline,
1-benzyl-3,3-dimethyl-2-methylene-indoline,
1-β-phenylethyl-3,3-dimethyl-2-methylene-indoline,
1-phenyl-3,3-dimethyl-2-methylene-indoline,
1-β-chloroethyl-3,3-dimethyl-2-methylene-indoline,
1-β-cyanoethyl-3,3-dimethyl-2-methylene-indoline,
1-methyl-3,3-dimethyl-5-methoxy-2-methylene-indoline,
1-methyl-3,3-dimethyl-5-ethoxy-2-methylene-indoline,
1-methyl-3,3-dimethyl-5-phenoxy-2-methylene-indoline,
1-methyl-3,3-dimethyl-5-acetylamino-2-methylene-indoline,
1-methyl-3,3-dimethyl-5-methyl-sulphonylamino-2-methylene-indoline,
1-methyl-3,3-dimethyl-5-dimethylamino-2-methylene-indoline,
1-methyl-3,3-dimethyl-5-fluoro-2-methylene-indoline,
1-methyl-3,3-dimethyl-5-chloro-2-methylene-indoline,
1-methyl-3,3-dimethyl-5-bromo-2-methylene-indoline,
1-methyl-3,3-dimethyl-5-methylsulphonyl-2-methylene-indoline,
1-methyl-3-3-dimethyl-5-acetyl-2-methylene-indoline,
1-methyl-3,3-dimethyl-5-methoxy-carbonyl-2-methylene-indoline,
1-ethyl-3,3-dimethyl-5-ethoxycarbonyl-2-methylene-indoline,
1-methyl-3,3-dimethyl-5-phenyl-2-methylene-indoline,
1-methyl-3,3-dimethyl-4,6-bis-methoxy-carbonyl-2-methylene-indoline,
1-methyl-3,3-dimethyl-7-ethyl-2-methylene-indoline,
1-methyl-3,3-dimethyl-7-chloro-2-methylene-indoline,
1-methyl-3,3-dimethyl-5-chloro-7-methoxy-2-methylene-indoline,
1-methyl-3,3-dimethyl-4,5-benzo-2-methylene-indoline,
1-ethyl-3,3-dimethyl-4,5-benzo-2-methylene-indoline,
1-methyl-3,3-dimethyl-6,7-benzo-2-methylene-indoline,
1-methyl-3,3-dimethyl-5,7-dichloro-2-methylene-indoline,
1-methyl-3,3-diethyl-2-methylene-indoline,
1,3,3-triethyl-2-methylene-indoline,
1-dimethylamino-3,3-dimethyl-2-methylene-indoline,
1-dimethylamino-3-methyl-3-phenyl-2-methylene-indoline,
1,7-di- or
trimethylene-3,3-dimethyl-2-methylene-indoline,
1,3,6-trimethyl-4-methylene-pyrimidone-(2) (Formula X),
1,3-dimethyl-2-methylene-dihydro-(1,2)-quinoxaline Formula XI),
1-phenyl-3-methyl-2-methylene-dihydro-(1,2)-quinoxaline,
1,4-dimethyl-2-methylene-dihydro-(1,2)-quinoxalone-(3) (Formula XII),
1-methyl-4-n-propyl-2-methylene-dihydro-(1,2)-quinoxalone-(3),
3-methyl-4-methylene-dihydro-(3,4)-quinazolone-(2) and 1,3-dimethyl-6- methoxy- or
-6-ethoxy-4-methylene-dihydro-(3,4)-quinazolone(2);

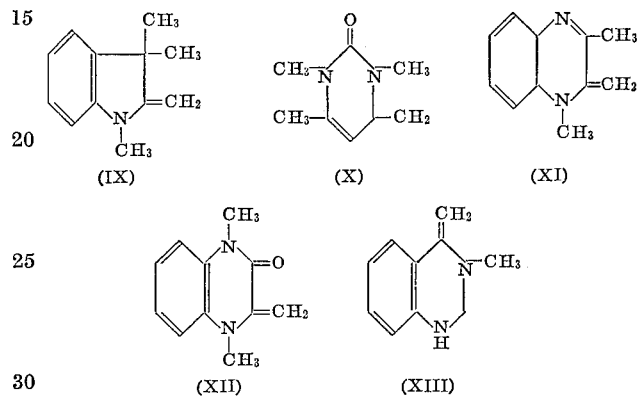

Suitable compounds of the Formula IIa are, for example, the salts of the above compounds (II) with hydrochloric acid, hydrobromic acid, sulphuric acid, methylsulphuric acid, ethyl-sulphuric acid, benzene- and p-toluenesulphonic acid and acetic acid as well as 1,2-dimethylbenzo(c,d)-indolium chloride (Formula XIV); 1-ethyl-2-methylbenzo(c,d)-indolium chloride or bromide or iodide or sulphate or ethylsulphate; 1-ethyl-2-methyl-6-methoxy-benzo(c,d)-indolium chloride, 2,3-dimethyl-benzothiazolium methylsulphate, 2,3 - dimethyl-6-methoxy-benzothiazolium chloride, 1,4-dimethyl-quinolinium methylsulphate eand 1,2-dimethyl-isoquinolinium methylsulphate;

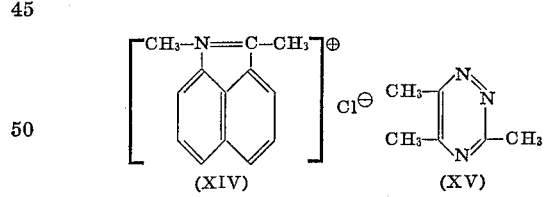

Suitable phenoxazine aldehydes of the Formula III are, for example

N-methyl-phenoxazine-3-aldehyde,
N-ethyl-phenoxazine-3-aldehyde,
N-β-chloroethyl-phenoxazine-3-aldehyde,
N-β-cyanoethyl-phenoxazine-3-aldehyde,
N-β-dimethylamaino-ethyl-phenoxazine-3-aldehyde,
N-β-diethylaminoethyl-phenoxazine-3-aldehyde,
N-β-piperidyl-(1′)-ethylphenoxazine-3-aldehyde,
N-n-propyl-phenoxazine-3-aldehyde,
N-n-butyl-phenoxazine-3-aldehyde,
N-benzyl-phenoxazine-3-aldehyde,
N-β-phenylethyl-phenoxazine-3-aldehyde,
N-phenyl-phenoxazine-3-aldehyde,
N-4′-methylphenyl-phenoxazine-3-aldehyde,
N-4′-chlorophenyl-phenoxazine-3-aldehyde,
N-4′-methoxyphenyl-phenoxazine-3-aldehyde,
N-4′-ethoxyphenyl-phenoxazine-3-aldehyde,
N-methyl-2,8-dimethyl-phenoxazine-3-aldehyde,
N-methyl-2,8-dimethoxy-phenoxazine-3-aldehyde,
N-methyl-7-methoxy- or -7-ethoxy-phenoxazine-3-aldehyde,
N-methyl-7-chloro- or
-7-bromo-phenoxazine-3-aldehyde,
N-methyl-7-acetylamino-phenoxazine-3-aldehyde,
N-methyl-7-dimethyl-amino-phenoxazine-3-aldehyde,
N-methyl-7-methoxycarbonyl-phenoxazine-3-aldehyde,
N-ethyl-7-acetyl-phenoxazine-3-aldehyde,
N-methyl-6,7-benzo-phenoxazine-3-aldehyde,
N-methyl-8,9-benzo-phenoxazine-3-aldehyde and
N-n-butyl-1,2,8,9-dibenzo-phenoxazine-3-aldehyde.

Suitable compounds of the Formula IV are, for example 2,3,3 - trimethyl-indolenine and its nuclear substitution and benzo-anellation products corresponding to the above compounds (II), 2-methyl-benzothiazole, 3-methyl-indazole, 1,3-dimethyl-indazole, 1 - phenyl - 3-methyl-indazole and 2,5,6-trimethyl-1,3,4-triazine (Formula XV).

Suitable compounds of the Formula IVa are, for example, the salts of compounds (IV) with hydrochloric acid, hydrobromic acid, sulphuric acid, methyl- and ethyl-sulphuric acid, benzene-sulphonic acid, p-toluene-sulphonic acid, and acetic acid.

Suitable aldehydes of the Formula VII are, for example, those obtained when applying the Vilsmeier aldehyde synthesis to the above methylene compounds of the Formula II.

Suitable phenoxazine compounds of the Formula VIII are, for example, the phenoxazines (without aldehyde group) from which the phenoxazine-3-aldehydes of the Formula III mentioned above are derived.

Preferred dyestuffs within the scope of compounds of the Formula I are dyestuffs of the formula

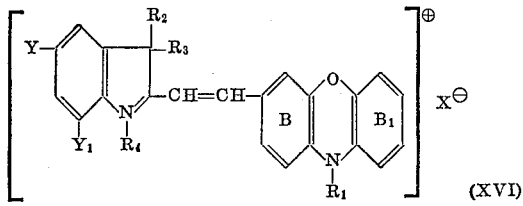

(XVI)

in which Y and $Y_1$, independently of one another, represent hydrogen or non-ionic substituents; $R_1$ and X have the same meaning as above; $R_2$, $R_3$ and $R_4$, independently of one another, stand for lower alkyl groups; $R_1$ may be linked to B or $B_1$; and the radicals $R_1$ and $R_4$ and the rings B and $B_1$ as well as the indole ring may contain non-ionic substituents, and the aforesaid rings may carry further anellated rings.

The individual processes for the production of the new dyestuffs are carried out, for example, by heating the compound (II) or its salts (IIa) and the equivalent amount of an aldehyde (III) with an acid with the optional addition of water or an organic solvent. The aldehyde (III) may be used in excess or in a deficient amount. The same applies to the condensation of a compound (IV) or (IVa) with an aldehyde (III). The reaction temperature lies between room temperature and about 150° C.; higher temperatures are frequently possible, but not necessary. In general, the condensation proceeds most satisfactorily between about 70° C. and 120° C.

Acids suitable for the reaction are organic or inorganic acids, for example, acetic acid, chloroacetic acid, propionic acid, butyric acid, hydrochloric acid, sulphuric acid, phosphoric acid, benzene-sulphonic acid and methane-sulphonic acid as well as mixtures of these acids with one another. If organic acids are used, acetic acid anhydride may be added to accelerate the condensation. It is also possible to carry out the condensation in an organic solvent, such as methylene chloride, chloroform, carbon tetrachloride, ethylene chloride, benzene, chloro- and dichlorobenzene or nitrobenzene, with the addition of a condensation agent, e.g. phosphorus oxychloride, phosphorus trichloride, thionyl chloride, sulphuryl chloride, phosgene or titanium (IV) chloride. This method is generally of advantage when an aldehyde of the Formula VII is to be condensed with a phenoxazine derivative VIII.

The dyestuffs formed are isolated in the usual manner, for example, by simply filtering them off with suction from the cold condensation mixture or by diluting with water and salting out with sodium chloride or zinc chloride. If the condensation is carried out in an organic solvent, it is frequently expedient to distil the latter off with steam and then to salt out the resultant dyestuff solution. The dyestuff salts so obtained can be purified by recrystallisation from water or alcohol.

Dyestuff salts of the Formula V can be converted into the corresponding bases (VI) in an aqueous solution or in organic solvent by the reaction with alkaline agents, such as sodium carbonate, sodium hydroxide, milk of lime, ammonia or amines. These bases are converted into the desired dyestuffs of the Formula I in an inert organic solvent by treatment with quaternising agents, such as methyl iodide, methyl bromide, methyl chloride, dimethyl sulphate, benzene and toluene-sulphonic acid methyl or ethyl ester, trimethyl phosphate, diethyl sulphate, 2-chlorodiethyl ether, chloro acetic acid methyl or ethyl ester, bromoacetic acid methyl or ethyl ester, chloroacetonitrile, 2-chloropropionitrile, ethylene-chlorohydrin, 2-diethylaminoethyl chloride or -bromide, ω-chloroacetophenone or benzylchloride.

The type of anion X contained in the dyestuffs (I) is generally of no importance for the dyeing properties and is determined by the method of production and the possible purification of the crude dyestuff. In general, the dyestuffs are present as halides, especially as chlorides or bromides, or as methosulphates, ethosulphates, sulphates, benzene- or toluene-sulphates or acetates. These anions can be exchanged in any way for other anions, such as tetrafluoborate, phosphate, chlorozincate, nitrate, perchlorate, oxalate, propionate, formate, citrate, maleinate, malate, tartrate, lactate or benzoate ions.

The dyestuffs which can be obtained according to the invention are new. They are suitable for the dyeing, printing and mass-dyeing of synthetic and semisynthetic materials, e.g. of synthetic superpolyamides and acetate rayon, of leather, coconut fibres, paper and jute, for the production of inks and pastes for ball point pens, for the use in offset printing, but primarily for the dyeing, printing and mass-dyeing (spin-dyeing) of materials which completely or predominantly consist of polymerised acrylonitrile and/or vinylidene cyanide or of acid-modified aromatic polyesters.

The dyeings and prints on acrylonitrile polymers are characterised by excellent fastness properties, especially fastness to light, wet processing, cross-dyeing, decatizing, sublimation, exhaust fumes and rubbing, and by a good white-dischargeability. The dyestuffs are readily soluble, they give deep dyeings, due to their high yield and very good affinity, and they do not soil wool.

Dyestuffs of the Formula XVI are moreover characterised, in addition to their outstanding fastness properties, by their unusual long-wave absorption which enables blue to green dyeings of great depth of colour to be produced. These dyeings also have a very good so-called "evening colour," i.e. their shade is not changed in an undesirable manner by artificial light.

The parts given in the following example are parts by weight.

EXAMPLE 1

35 parts 1,3,3-trimethyl-2-methylene-indoline and 45 parts N-methyl-phenoxazine-3-aldehyde are stirred with 200 parts glacial acetic acid at about 100° C. for 3 hours. After cooling to below 40° C., the solution is poured into 1000 to 2000 parts of water and the dyestuff is salted out by the addition of a sodium chloride solution. The precipitate is initially gel-like, but crystallises after standing for some time or upon the addition of a further amount of sodium chloride solution. The yield is quantitative.

The dyestuff can be recrystallised from water. It corresponds to the formula

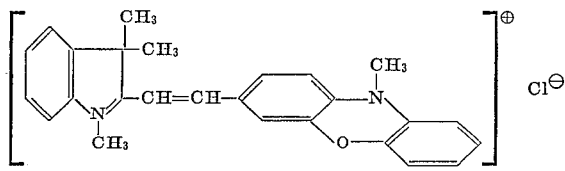

and yields reddish blue dyeings and prints of outstanding fastness properties on materials of polyacrylonitrile.

The N-methyl-phenoxazine-aldehyde used above was prepared as follows: 116 parts N-methyl-phenoxazine (prepared according to Müller, Buu-Hoi and Rips, J. Org. Chem. 24, page 37) and 50 parts dimethyl formamide are dissolved in 500 parts chloroform and mixed at 50 to 60° C. with 100 parts phosphorus oxychloride. The mixture is heated at about 60° C. for 5 hours. After cooling, the unreacted phosphorus oxychloride is destroyed by stirring with about 100 parts of water, and the chloroform is distilled off with steam. The remaining oil crystallises upon cooling. The crude aldehyde can be purified by recrystallisation from methyl-cyclohexane and then melts at 98 to 100° C.

If the 1,3,3-trimethyl-2-methylene-indoline is replaced with the equivalent amount of one of the following indoline derivatives, very valuable new dyestuffs are also obtained by the otherwise unchanged method.

| Indoline derivative | Shade |
| --- | --- |
| 1-ethyl-3,3-dimethyl-2-methylene-indoline | Reddish blue. |
| 1-n-propyl-3,3-dimethyl-2-methylene-indoline | Do. |
| 1-n-butyl-3,3-dimethyl-2-methylene-indoline | Do. |
| 1-iso-amyl-3,3-dimethyl-2-methylene-indoline | Do. |
| 1,3,3-triethyl-2-methylene-indoline | Do. |
| 1,3,3,5-tetramethyl-2-methylene-indoline | Do. |
| 1,3,3,7-tetramethyl-2-methylene-indoline | Do. |
| 1,3,3-trimethyl-7-ethyl-2-methylene-indoline | Do. |
| 1,3,3-trimethyl-5-isopropyl-2-methylene-indoline | Do. |
| 1,3,3-trimethyl-5-phenyl-2-methylene-indoline | Blue. |
| 1,3,3-trimethyl-5-chloro-2-methylene-indoline | Do. |
| 1,3,3-trimethyl-7-chloro-2-methylene-indoline | Do. |
| 1,3,3-trimethyl-5,7-dichloro-2-methylene-indoline | Greenish blue. |
| 1,3,3-trimethyl-5-bromo-2-methylene-indoline | Blue. |
| 1,3,3-trimethyl-5-fluoro-2-methylene-indoline | Do. |
| 1,3,3-trimethyl-5-cyano-2-methylene-indoline | Greenish blue. |
| 1,3,3-trimethyl-5-acetyl-2-methylene-indoline | Do. |
| 1,3,3-trimethyl-4-methoxycarbonyl-2-methylene-indoline | Blue. |
| 1,3,3-trimethyl-5-methoxycarbonyl-2-methylene-indoline | Greenish blue. |
| 1,3,3-trimethyl-7-methoxycarbonyl-2-methylene-indoline | Do. |
| 1,3,3-trimethyl-5-methoxy-2-methylene-indoline | Blue. |
| 1,3,3-trimethyl-5-ethoxy-2-methylene-indoline | Do. |
| 1,3,3-trimethyl-5-β-hydroxyethoxy-2-methylene-indoline | Do. |
| 1,3,3-trimethyl-5-β-methoxyethoxy-2-methylene-indoline | Do. |
| 1,3,3-trimethyl-5-β-chloroethoxy-2-methylene-indoline | Do. |
| 1,3,3-trimethyl-5-β-cyanoethoxy-2-methylene-indoline | Do. |
| 1,3,3-trimethyl-5,7-dimethoxy-2-methylene-indoline | Do. |
| 1,3,3-trimethyl-5-methoxy-7-chloro-2-methylene-indoline | Greenish blue. |
| 1,3,3-trimethyl-5-acetylamino-2-methylene-indoline | Do. |
| 1,3,3-trimethyl-5-methylsulphonylamino-2-methylene-indoline | Do. |
| 1,3,3-trimethyl-5-dimethylamino-2-methylene-indoline | Very strong. Greenish blue. |
| 1,3,3-trimethyl-4,5-benzo-2-methylene-indoline | Very strong. Greenish blue. |
| 1-ethyl-3,3-dimethyl-6,7-benzo-2-methylene-indoline | Very strong. Greenish blue. |

EXAMPLE 2

25.3 parts 2,8,10-trimethylphenoxazine-3-aldehyde and 15.2 parts 1,3,6-trimethyl-4-methylene-pyrimidone-(2) are heated under reflux for about 90 minutes in 500 to 1000 parts chloroform with 15 to 30 parts phosphorus oxychloride. The chloroform is then removed under reduced pressure. The residue is recrystallised from water with the addition of charcoal. A dyestuff of the formula

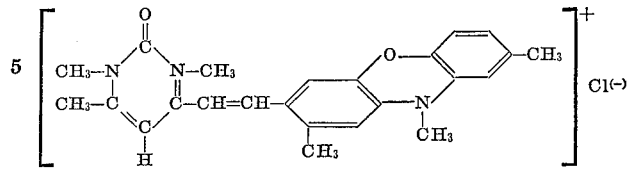

is obtained, which dyes materials of polyacrylonitrile in green blue shades of good fastness properties. When using instead of the above pyrimidone, an equivalent amount of 1-methyl-, 1-ethyl-, 1-n-propyl- or 1-phenyl-2-methylene-4-methyl-quinoxalone, fast green dyestuffs of the formula

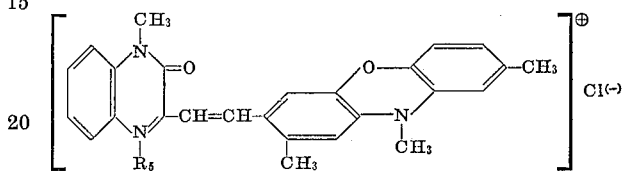

are likewise obtained; in the above formula, $R_5$ denotes the above defined radical in 1-position of the methylene-quinoxalone. The aldehyde used was prepared as follows:

63.5 parts 2,8-dimethyl-phenoxazine and 500 parts methanol were heated to 280 to 290° C. for 5 hours with the addition of 1 to 2 parts phosphorus trichloride in a tantalum autoclave. The resulting pressure amounted to 155 atm. After neutralizing the acids formed the mixture was fractionally distilled. The fraction which went over at 180 to 190° C. and 1.3 mm. Hg (which crystallized completely) was subjected to a Vilsmeier formulation according to the process described in Example 1. The aldehyde thus obtained melted at 165° C. after recrystallization from alcohol.

EXAMPLE 3

22.5 parts N-methyl-phenoxazine-3-aldehyde and 23.2 parts of the compound of the formula

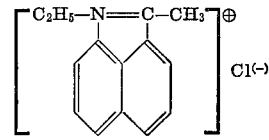

are heated with 75 to 150 parts of glacial acetic and 25 parts of acetic acid anhydride to 90 to 110° C. for 3 to 5 hours. After cooling the mixture is diluted by the addition of about 750 parts of water and sodium chloride is added until the resulting dyestuff of the formula

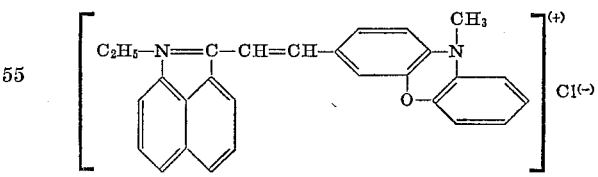

is completely precipitated. The dyestuff can be purified by recrystallizing from water with the addition of charcoal and yields on materials of polyacrylonitrile green dyeings and prints of very good fastness properties.

When using instead of 1-ethyl-2-methyl-benz-(c,d)-indolium chloride, an equivalent amount of 1-methyl-, 1-n-propyl-, 1-n-butyl-, 1-iso-amyl-, 1-phenyl- or 1,4'-methylphenyl-2-methyl-benz-(c,d)-indolium chloride or the corresponding bromides, methosulphates, ethosulphates or acetates, valuable green dyestuffs are likewise obtained under otherwise equal conditions.

EXAMPLE 4

20 parts 1,3,3-trimethyl-2-methylene-indoline-ω-aldehyde and 21.1 parts N-ethyl-phenoxazine are dissolved in 100 to 200 parts 1.2-dichloro-ethane. At about 80° C., 25 to 30 parts phosphorus oxychloride are run in. The mixture is kept at boiling temperature for another 1 to 2 hours, the excess phosphorus oxychloride is then decomposed by the addition of water and the dichloro-ethane is distilled off with steam. The dyestuff is isolated from the aqueous solution formed as described in Example 1. The dyestuff obtained corresponds to the formula

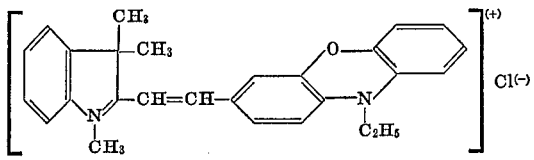

and yields blue dyeings and prints of outstanding fastness properties on materials of polyacrylonitriles.

When using instead of N-ethyl-phenoxazine, an equivalent amount of N-methyl-, N-β-hydroxy-ethyl- or N-β-cyanoethyl-phenoxazine valuable new dyestuffs of similar (somewhat more reddish) shade are likewise obtained.

What is claimed is:
1. A dyestuff having the formula

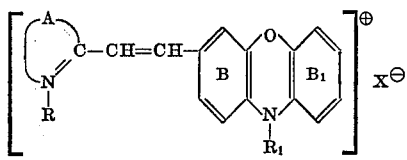

wherein A is a bivalent radical selected to complete, with the members

a member selected from the group consisting of pyrimidonyl, dihydroquinoxalinyl, dihydroquinoxalonyl, indoleninyl, benzoindoleninyl, benz-(c,d)-indolyl, indazolyl, triazinyl or A is said radical further containing an anellated benzene ring wherein said radical A is unsubstituted or contains a substituent selected from the group consisting of halogen, lower alkyl, phenyl, lower alkoxy, phenyloxy, di lower alkylamino, lower alkyl carbonyl, lower alkoxy carbonyl, lower alkyl sulphonyl, lower alkyl sulphonylamino, or lower alkyl carbonylamino and wherein R is a member selected from the group consisting of hydrogen, alkyl with 1 to 5 carbon atoms, alkyl with 1 to 5 carbon atoms and a substituent selected from the group consisting of chloro and cyano; phenyl, benzyl, phenyl ethyl or dimethylamino or R is a dimethylene or trimethylene radical bridging the radical A and the N carbon atom and wherein $R_1$ is selected from the group consisting of hydrogen, alkyl with 1–4 carbon atoms, alkyl with 1–4 carbon atoms and a substituent selected from the group consisting of hydroxy, chloro, cyano, di lower alkylamino and piperidyl; phenyl, phenyl containing a substituent selected from the group consisting of methyl, chloro or lower alkoxy; benzyl or phenyl ethyl; and wherein X denotes an anionic radical and wherein the member B contains a substituent selected from the group consisting of hydrogen, lower alkyl and lower alkoxy and the member $B_1$ contains a substituent selected from the group consisting of hydrogen, lower alkyl, lower alkoxy, chlorine, bromine, lower alkyl carbonylamino, lower alkyl carbonyl, lower alkoxy carbonyl and an anellated benzene radical.

2. A dyestuff of claim 1 having the formula

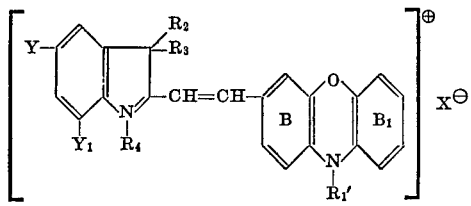

wherein Y is fluorine, chlorine, bromine, lower alkyl, phenyl, lower alkoxy, phenoxy, lower alkylamino, lower alkyl carbonyl, lower alkoxy carbonyl, lower alkyl carbonylamino, lower alkyl sulphonylamino, or lower alkyl sulfonyl; wherein $Y_1$ is selected from the group consisting of hydrogen, chlorine, lower alkoxy and lower alkyl wherein $R_1'$ is lower alkyl; wherein $R_2$, $R_3$ and $R_4$ independently of one another are lower alkyl groups.

3. A dyestuff of claim 1 having the formula

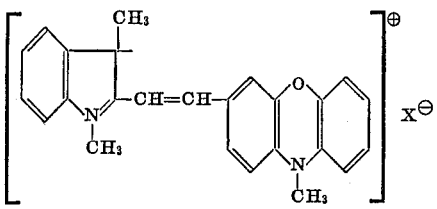

in which X is an anionic radical.

4. The dyestuff of claim 1 having the formula

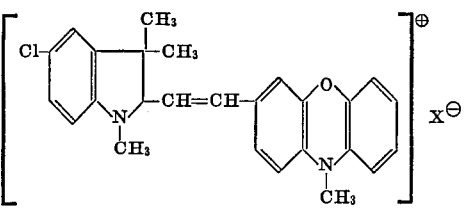

in which X is an anionic radical.

5. The dyestuff of claim 1 having the formula

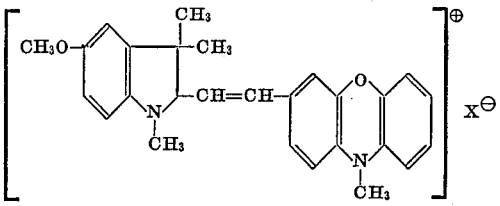

in which X is an anionic radical.

6. The dyestuff of claim 1 having the formula

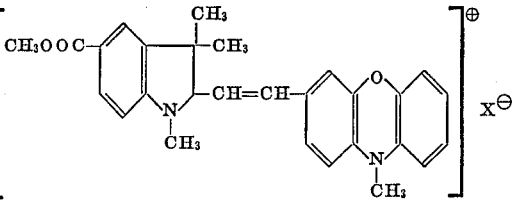

in which X is an anionic radical.

7. The dyestuff of claim 1 having the formula

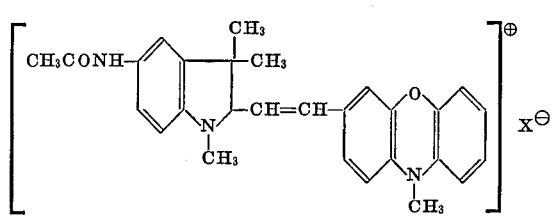

in which X is an anionic radical.

8. The dyestuff of claim 1 having the formula

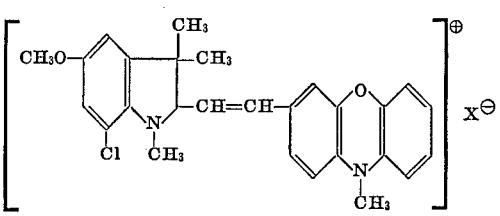

in which X is an anionic radical.

9. The dyestuff of claim 1 having the formula

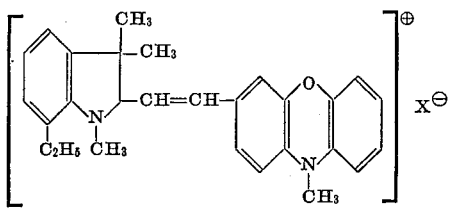

in which X is an anionic radical.

10. The dyestuff of claim 1 having the formula

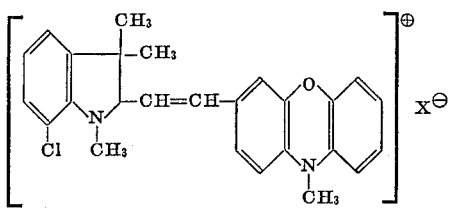

in which X is an anionic radical.

11. The dyestuff of claim 1 having the formula

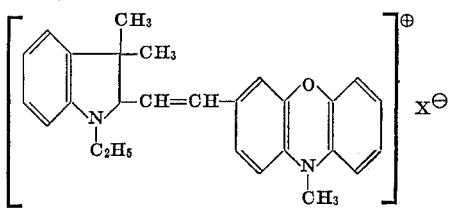

in which X is an anionic radical.

12. The dyestuff of claim 1 having the formula

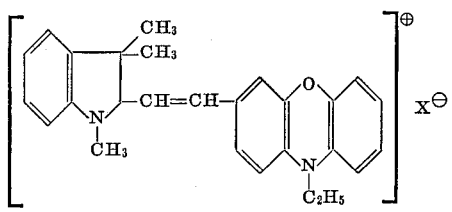

in which X is an anionic radical.

References Cited

UNITED STATES PATENTS

| | | | |
|---|---|---|---|
| 2,687,414 | 8/1954 | Cusic | 260—244X |
| 2,695,289 | 11/1954 | Muller et al. | 260—240 |
| 3,294,790 | 12/1966 | Harfenist | 260—244X |
| 3,305,547 | 2/1967 | Stach et al. | 260—244X |

JOHN D. RANDOLPH, Primary Examiner

U.S. Cl. X.R.

8—7, 12, 54, 57, 63, 177, 178, 179; 106—22, 176; 260—244, 248, 250, 251, 304, 313.1, 326.11